United States Patent [19]

Hackett et al.

[11] 4,363,835
[45] Dec. 14, 1982

[54] SPRAY BUFF REACTANT AND APPLICATION THEREOF

[75] Inventors: Walter J. Hackett, Westminster; Peter E. Galena, Huntington Beach, both of Calif.

[73] Assignee: Purex Corporation, Lakewood, Calif.

[21] Appl. No.: 253,300

[22] Filed: Apr. 13, 1981

[51] Int. Cl.³ .......................... B05D 3/02; B05D 3/12
[52] U.S. Cl. ................................. 427/355; 427/393.6; 524/100; 524/396
[58] Field of Search .................. 427/355, 385.5, 393.6; 524/100, 396

[56] References Cited
U.S. PATENT DOCUMENTS 3,294,754 12/1966 Narrmann .
3,413,252 11/1968 Lima .
3,481,910 12/1969 Branson .
3,541,045 11/1970 Jabloner .
3,669,892 6/1972 Abler et al. .
4,284,668 8/1981 Nixon ..................... 427/385.5 X

*Primary Examiner*—Michael R. Lusignan
*Attorney, Agent, or Firm*—William W. Haefliger

[57] ABSTRACT

The production of a toughened, mar-resistant floor film includes the steps:
(a) applying to a floor surface a liquid solution containing a cross-linking ingredient,
(b) and buffing said floor surface with said solution thereon in moist condition to heat the solution and surface and produce cross-linking of said ingredient with the floor surface.

18 Claims, 2 Drawing Figures

SPRAY BUFF REACTANT AND APPLICATION THEREOF

BACKGROUND OF THE INVENTION

This invention relates generally to treatment of polished and unpolished floor surfaces, and more particularly concerns the production of improved film surfaces on floors.

There is continuing need for floor film surfaces produced by spray buffing and characterized by extension of in-service life coupled with reduction in the frequency of required spray buffing (as compared to conventional spray buffing products).

SUMMARY OF THE INVENTION

It is a major object of the invention to produce a spray buffing composition, as well as method of its use, to meet the above need. Basically, the invention involves the spray-buffing (for example mist spray application of the product onto a polished floor followed by immediate buffing to a dry condition with a machine driven floor maintenance pad) of a specially formulated compound containing a cross-linking agent onto and into an in-service film. Cross-linking is achieved in the in-service film by virtue of the presence of the cross-linker in the spray buffing product and frictional heat derived from the power driven floor cleaning and polishing pad. High speed spray buffing produces the beneficial effects described below faster than conventional speed spray buffing units and procedures, but the composition gives improved benefits, even while using conventional procedures. An overall benefit is the extension of the service life of the in-service film coupled with overall improved performance during its life and a reduction in the frequency of needed spray buffing (when compared to conventional spray buffing products). Treatment of uncoated floor surfaces, particularly in the masonry family, for example terrazzo, marble, clays, etc., is also possible with the invention. Observed improvements as regards improved performance and extension of service life are listed as follows:

(a) Film toughening as evidenced by improved scuff and scratch resistance
(b) Improved detergent and water resistance
(c) Improved powdering resistance
(d) Improved heel mark resistance
(e) Improved overall gloss In addition, it is found that it is possible to overcoat the spray buffed film of the invention with additional coats of floor finish, thereby upgrading gloss still further, but more importantly thereby providing fresh crosslinkable sites on the floor.

Further, it is noted that the "cross-link" product's use does not have the drawbacks of conventional spray-buff products wherein removal difficulties and reduction of slip resistance levels are many times produced.

The described spray-buff composition contains polymeric ingredients in the family of floor finish ingredients, and the final spray-buff composition is meant for the maintenance of in-service floor finish films. The preferred cross-linking agent may also be incorporated into other basic types of otherwise conventional spray-buff products, e.g., water-emulsion, wax-based products, with and without solvent fractions.

These and other objects and advantages of the invention, as well as the details of an illustrative embodiment, will be more fully understood from the following description and drawings, in which:

DRAWING DESCRIPTION

FIG. 1 is an elevation showing spray buffing of an applied formulation, in accordance with the invention; and FIG. 2 is another view like FIG. 1.

DETAILED DESCRIPTION

Figure 1:
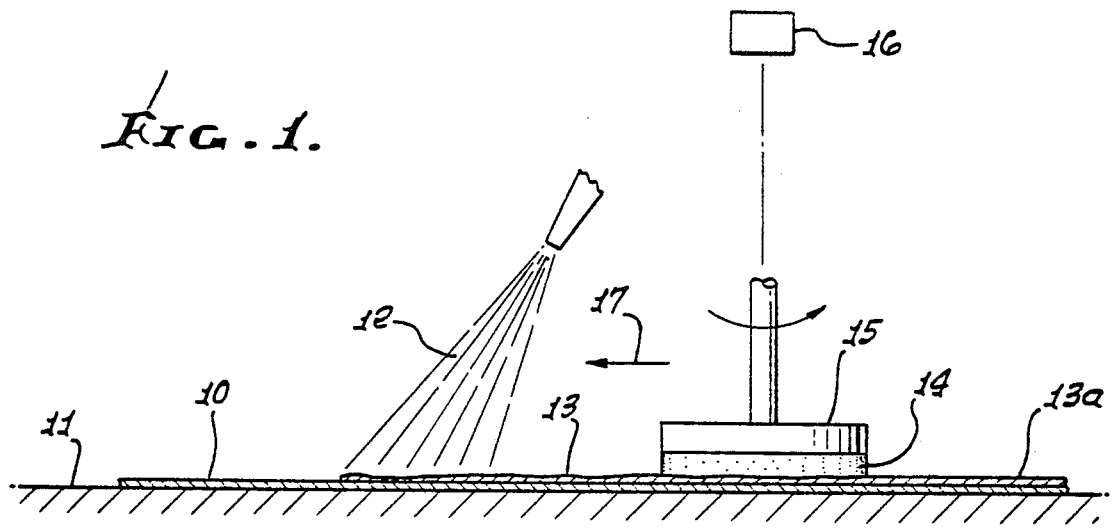

Referring first to FIG. 1, a layer of in-service floor finish 10 is shown on floor 11, layer 10 for example consisting of a conventional polished finish such as polymeric finish or floor wax, which was previously applied to the floor. In order to produce the tough, and more mar-resistant floor film, in accordance with the invention, a liquid solution is applied to the layer 10, as by spraying the solution downwardly into the air, as at 12, above the layer 10, so that solution droplets collect on the layer 10 as at 13. The solution contains an ingredient capable of producing cross-linking (as by oxygen group bridging) of the ingredient with the floor surface, i.e. the surface of layer 10, and in instances of uncoated flooring the surface at 11, in response to heat produced as a result of high speed buffing of the solution droplets on layer 10 or surface 11. Such heat is produced by frictional rubbing of the abrasive or non-abrasive buffing pad 14 on layer 10 to which the solution droplets have been applied, as by spraying. A rotor carrying the pad is indicated at 15, and the high speed rotary drive for the rotor is indicated at 16. As the rotor is rotated, it is traveled over the droplet area, as shown by arrow 17. Pad 14 typically consists of non-woven fiber and resinous binder in which abrasive particles may or may not be distributed, and having exposed edges that rub against the solid surfaces layer 10 to produce heat as the rotor rotates, as for example at speeds in excess of 1,000 rpm. The resultant tough film is shown at 13a, cross-linked with layer 10.

In accordance with the invention, the liquid solution ranging in total solids from 2% to 40% consists essentially of:

| Ingredient | Range of wt percent | Preferred wt. percent |
|---|---|---|
| (a) water emulsion acrylic, stryene acrylic, vinyl acetate-acrylic, etc. polymer (typically at 34–36%) | 5.0–90.0% | about 39% |
| (b) water soluble solvent | 0.5–6.0% | about 4% |
| (c) non-ionic surfactant | 0.1–2.0% | about 1% |
| (d) volatile amine | 0.1–3.0% | about 1% |
| (e) humectant | 0.1–4.0% | about 2% |
| (f) cross-linking agent selected from group that includes methylated melamine and sodium benzoate | 0.1%–10.09 | 1.5–4.0% |
| (g) ammonia | 0.1–2.0% | about 1% |
| (h) water | balance | balance |
| Optional Ingredients | | |
| (i) anionic or nonionic wax or polyolefin emulsion at typical solids of 16.0% or polyethylene latex, e.g., Poly-Ems. | 0–16% | about 6% |
| (j) Resin Fractions-solubilized at typical solids of 16% Rosin-based resins Styrene maleic anhydrides Styrene acrylic acid Pentaerythritol-based resins | | |

| | Range of wt percent | Preferred wt. percent |
|---|---|---|
| Alkyd based resins | 0–25% | about 10% |

Among suitable wax and polyolefin materials are waxes and mixtures of waxes of vegetable, animal or synthetic origin including carnauba, candelilla, montan, lanolin, cocoa butter, cottonseed, stearin, Japan, bayberry, myrtle, mace, palm kernel, beeswax, spermaceti, Chinese insect, tallow among the natural waxes and Fischer-Tropsch and hydrogenated coconut and soybean oil waxes among the synthetic waxes, as well as emulsifiable polyolefin waxes, particularly of olefin monomers having 2 or 3 carbon atoms i.e. ethylene and propylene in major proportion. Ethylene- and propylene-acid copolymers are also suitable, as are paraffin and microcrystalline waxes, both oxidized and unoxidized, ceresin and ozokerite waxes.

"Waxes" include polyolefins of low, medium and high molecular weight which are emulsifiable e.g. from waxes to high polymers or are supplied as latexes, etc. Poly-Em products.

Suitable resin fractions are identified in (j) above.

If the cross-linking agent is methylated melamine, its weight percent is typically about 4.0; whereas if the cross-linking agent is sodium benzoate, its weight percent is typically about 1.5. Further, the solution preferably also includes a small amount of ammonia, i.e. about 0.60 weight percent when the cross-linking agent consists of the melamine, and about 0.25 when the cross-linking agent consists of sodium benzoate. In either case, the water soluble solvent preferably consists of glycol ether; the surfactant preferably consists of nonylphenoxy poly-(ethyleneoxy) ethanol; the volatile amine preferably consists of 2-Amino, 2-Methyl Propanol-1, and the humectant preferably consists of ethylene glycol. Cross-linking between oxygen groups such as OH− and COOH− is believed to occur at buffing temperatures in excess of 120° F., and preferably in excess of 150° F., i.e. 170°–180° F.

The ingredients and their functions in the solution composition are listed as follows:

| Ingredient | Function | |
|---|---|---|
| 1. Water | (a) | Carrier |
| | (b) | Diluent |
| | (c) | Lesser cleaning agent |
| | (d) | Lubricant |
| 2. Plasticized or non-plasticized water-emulsion styrene polymers or copolymers of styrene-acrylate-methacrylic acid or acrylate-methacrylic acid or vinyl acetate-acrylate-methacrylic acid—all with or without zinc salt, or polish products built around the above polymers (Where practical acrylic acid can also be substituted for the methacrylic acid shown above) | (a) | Film foaming agent |
| | (b) | Supplier of fresh cross-linking sites in film |
| 3. Surfactant | | Cleaning agent |
| 4. Ammonia | (a) | Cleaning agent |
| | (b) | May serve also to "decross-link" the zinc cross linked carboxyls in the in-service film thereby freeing up acid groups for cross-linking with the melamine cross-linking agent |
| 5. Amine | (a) | As in 4a and 4b |
| | (b) | Catalyst and stabilizer for melamine ingredient |
| 6. Humectant, e.g., ethylene glycol | (a) | Film emollient |
| | (b) | Film moisturizer |
| | (c) | Lesser cleaning agent |
| 7. Water soluble solvent e.g., glycol ethers | (a) | Coalescing agent for polymer |
| | (b) | Penetrating agent component (into in-service film) |
| | (c) | Lesser cleaning agent |
| | (d) | Cosolvent for cross-linking agent |
| 8. Cross-linking agent | (a) | As disclosed herein |
| Optional Ingredients | | |
| 9. Anionic or nonionic wax or polyolefin emulsion or polyolefin latex, e.g. Poly-Ems | (a) | Aid to buffing ease |
| | (b) | Lubricant |
| | (c) | Supplier of fresh cross-linking sites |
| 10. Resin solutions | (a) | Gloss contributor |
| | (b) | Film forming agent |
| | (c) | Supplier of fresh cross-linking sites |

Specific formula examples are listed as follows: (Examples 1 and 2 being preferred)

EXAMPLE 1

| Ingredient | wt. percent |
|---|---|
| PM-833 polymer (a product of Purex Corporation)[1] | 39.00 |
| Dipropylene glycol monomethyl ether (Ucar 2LM) | 4.00 |
| Nonylphenoxy poly-(ethyleneoxy) ethanol (Igepal CO 630) | 1.00 |
| 2-Amino, 2-Methyl Propanol-1 (AMP) | 1.00 |
| Ethylene glycol | 2.00 |
| Methylated melamine | 4.00 |
| Dye | 0.2g/gal. |
| Formaldehyde (Preservative) | 0.05 |
| Aqua Ammonia 0.60 | |
| Soft water | balance |

[1]Water emulsion, zinc-containing, styrene-acrylate-methacrylic acid copolymer.

EXAMPLE 2

| Ingredient | wt. percent |
|---|---|
| PM-292 polymer a water-emulsion, styrene-acrylate-methacrylic acid copolymer with no zinc component, produced by Purex Corporation Carson, California | 38.06 |
| Sodium benzoate | 1.54 |
| Dipropylene glycol monomethyl ether (Ucar 2LM) | 4.12 |
| Igepal CO 630 | 1.30 |
| 2-Amino, 2-Methyl-Propanol-1 (AMP) | 1.03 |
| Ethylene glycol | 2.06 |
| Aqua Ammonia | 0.25 |
| Soft water | balance |

EXAMPLES 3 and 4

| Ingredient | wt. percent Ext. 3 | Ext. 4 |
| --- | --- | --- |
| PM-292 polymer | 36.96 | 36.96 |
| Ucar 2LM | 3.89 | 3.89 |
| Igepal CO 630 | 1.00 | 1.00 |
| AMP | 1.00 | 1.00 |
| Dibutyl phthalate (plasticizer) | 1.00 | 1.00 |
| Ethylene glycol | 2.00 | 2.00 |
| Methylated melamine | 3.89 | 3.89 |
| Sodium benzoate | 0.50 | — |
| Aqua Ammonia | 0.24 | 0.24 |
| Poly-Em 40 | — | 4.75 |
| Soft water | balance | balance |

EXAMPLE 5

| Ingredient | wt. percent |
| --- | --- |
| PM-833 polymer | 44.95 |
| Ucar 2LM | 4.00 |
| Igepal CO 630 | 1.00 |
| AMP | 1.00 |
| Ethylene glycol | 2.00 |
| Sodium benzoate | 1.50 |
| Soft water | balance |

Figure 2:
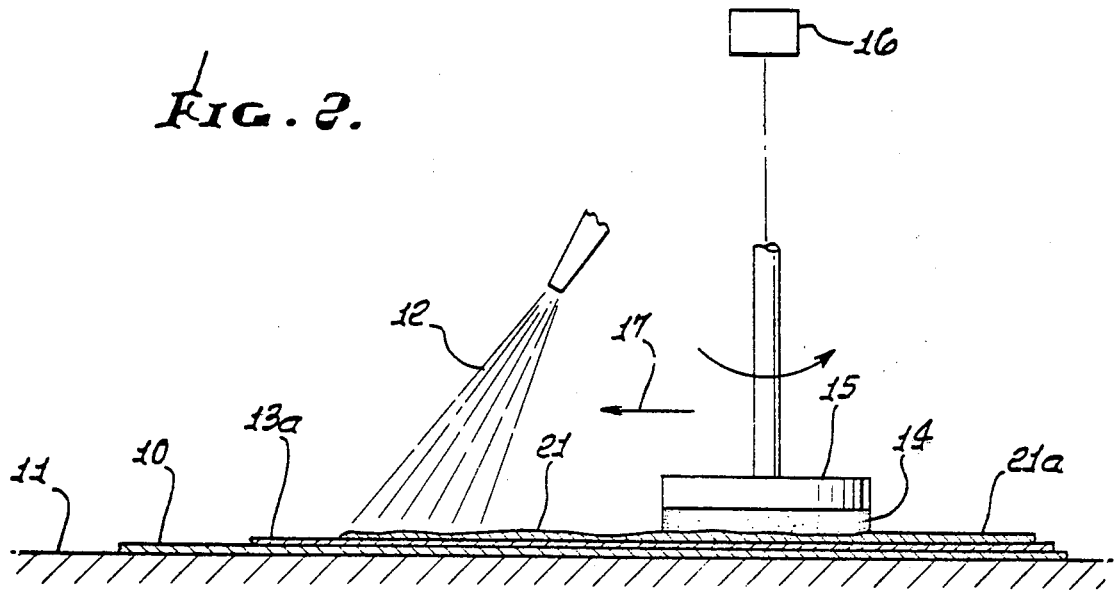

FIG. 2 is the same as FIG. 1, except that a second application of solution 21 is shown as sprayed on completed film 13a, as referred to above. The collected droplets of solution 21 are buffed in the same manner as described above, to produce a tough film 21a cross-linked with film 13a, wherein 13a is further cross-linked. Solution 21 consists of any of the described formulas.

We claim:

1. In the method of producing a toughened, mar-resistant floor film, the steps that include
   (a) applying to an already formed floor surface film a liquid solution containing a polymerized film forming agent and a cross-linking ingredient,
   (b) and buffing said floor surface film with said solution thereon in moist condition to heat the solution and surface film and produce cross-linking of said agent with the floor surface film to harden said film,
   (c) said cross linking ingredient selected from the group that consists essentially of methylated melamine and sodium benzoate.

2. The method of claim 1 wherein said application step is carried out by spraying the solution downwardly into the air so that solution droplets collect on the floor surface.

3. The method of claim 1 wherein said buffing is carried out using a buffing pad, and by rotating the pad in contact with the floor surface.

4. The method of claim 3 wherein the pad is in the form of a disc having a side which is rotated in engagement with the floor surface, the speed of rotation being in excess of 1,000 RPM.

5. The method of claim 1 wherein said cross linking is effected by oxygen group bridging.

6. In the method of producing a toughened, mar-resistant floor surface, the steps that include
   (a) applying to a floor surface an a liquid solution containing a polymerized film forming agent and a cross-linking ingredient,
   (b) and buffing said floor surface with said solution thereon in moist condition to heat the solution and surface and produce cross-linking of said agent with the floor surface to harden said surface,
   (c) said cross linking ingredient selected from the group that consists essentially of methylated melamine and sodium benzoate.

7. The method of claim 6 wherein said cross linking is effected by oxygen group bridging.

8. The method of claim 1 wherein said floor surface film is defined by a floor polish.

9. The method of claim 7 wherein said floor surface is free of polish and free of sealant.

10. The method of claim 8 wherein said floor polish is polymer or wax based and contains other $OH^-$ or $COOH^-$ containing ingredients.

11. The method of claim 1 wherein said liquid solution consists essentially of:

| Ingredient | wt. percent range |
| --- | --- |
| (a) water-emulsion acrylic polymer, styrene acrylic polymer, or vinyl acetate-acrylic[,] [etc.] polymer | 5.0–90.0% |
| (b) water soluble solvent | 0.5–6.0% |
| (c) non-ionic surfactant | 0.1–2.0% |
| (d) volatile amine | 0.1–3.0% |
| (e) humectant | 0.1–4.0% |
| (f) cross-linking agent selected from group that includes methylated melamine and sodium benzoate | 0.1–10.0% |
| (g) ammonia | 0.1–2.0 |
| (h) water | balance |

12. The method of claim 11 wherein said cross linking agent consists of about 4.0 weight percent methylated melamine.

13. The method of claim 11 wherein said cross linking agent consists of about 1.5 weight percent sodium benzoate.

14. The method of claim 12 wherein said solution includes about 0.60 weight percent aqua ammonia.

15. The method of claim 13 wherein said solution includes about 0.25 weight percent aqua ammonia.

16. The method of either of claims 12 and 13 wherein said water soluble solvent consists of glycol ether, said surfactant consists of nonylphenoxy poly-(ethyleneoxy) ethanol, said volatile amine consists of 2-Amino, 2-Methyl Propanol-1, and said humectant consists of ethylene glycol.

17. The method of claim 1 wherein said buffing is carried out to produce a floor surface temperature in excess of 120° F.

18. The method of claim 3 wherein said buffing, by pad rotation, is carried out to produce a floor surface temperature between 170° F. and 180° F.

* * * * *

UNITED STATES PATENT AND TRADEMARK OFFICE
CERTIFICATE OF CORRECTION

PATENT NO. : 4,363,835

DATED : December 14, 1982

INVENTOR(S) : Walter J. Hackett and Peter E. Galena

It is certified that error appears in the above-identified patent and that said Letters Patent are hereby corrected as shown below:

Column 6, line 5, delete "(a) applying to a floor surface an a liquid solution" and substitute --(a) applying to a floor surface a liquid solution--

Column 6, line 31, delete "vinyl acetate-acrylic[,] [etc.]" and substitute --vinyl acetate-acrylic--

Signed and Sealed this

Fifth Day of July 1983

[SEAL]

Attest:

GERALD J. MOSSINGHOFF

Attesting Officer     Commissioner of Patents and Trademarks